United States Patent [19]

Powell

[11] Patent Number: 4,642,209
[45] Date of Patent: Feb. 10, 1987

[54] TAXIDERMY MOLD WITH MEANS FOR HOLDING EYE WITHIN MOLD DURING FORMATION OF TAXIDERMY FORM, AND METHOD

[75] Inventor: Leon T. Powell, Salisbury, N.C.

[73] Assignee: McKenzie Taxidermy Supply, Inc., Granite Quarry, N.C.

[21] Appl. No.: 766,439

[22] Filed: Aug. 16, 1985

[51] Int. Cl.⁴ .................... B29C 67/22; B29C 39/10; B29C 33/14; B29C 39/26
[52] U.S. Cl. .................... 264/46.4; 249/96; 264/46.9; 264/261; 264/271.1; 264/275; 264/277; 425/123; 425/817 R
[58] Field of Search .................... 264/46.4, 46.9, 261, 264/271.1, 275, 277; 249/96; 425/123, 817 R

[56] References Cited

U.S. PATENT DOCUMENTS

| | | | |
|---|---|---|---|
| 4,432,919 | 2/1984 | Rinehart | 264/46.4 |
| 4,511,522 | 4/1985 | Rinehart | 264/46.4 |
| 4,515,340 | 5/1985 | Rinehart | 264/46.4 X |
| 4,596,683 | 6/1986 | Powell | 264/261 X |

Primary Examiner—Philip Anderson
Attorney, Agent, or Firm—W. Thad Adams, III

[57] ABSTRACT

A taxidermy mold (10) is disclosed which includes an eye socket recess (13) into which an artificial eye (20) is inserted. Eye (20) is held in mold (10) while a hardenable liquid foam is poured into mold (10) to create a taxidermy form (30) having a molded eye therein. The eye (20) is held within the eye socket recess (13) during molding by means of an adhesive which separates from the eye (20) and remains in eye socket recess (13) when mold (10) is removed from the taxidermy form (30). It is therefore unnecessary to provide an additional step of cleaning the adhesive from the eye (20) after molding is completed.

7 Claims, 10 Drawing Figures

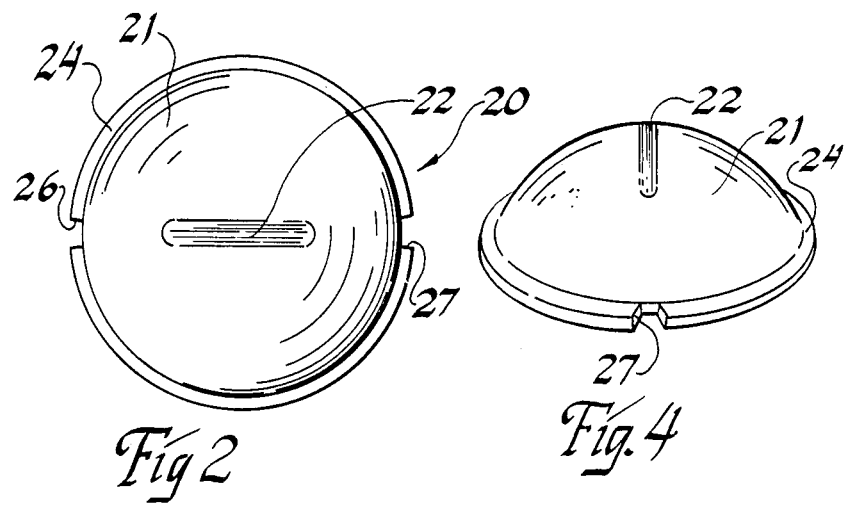
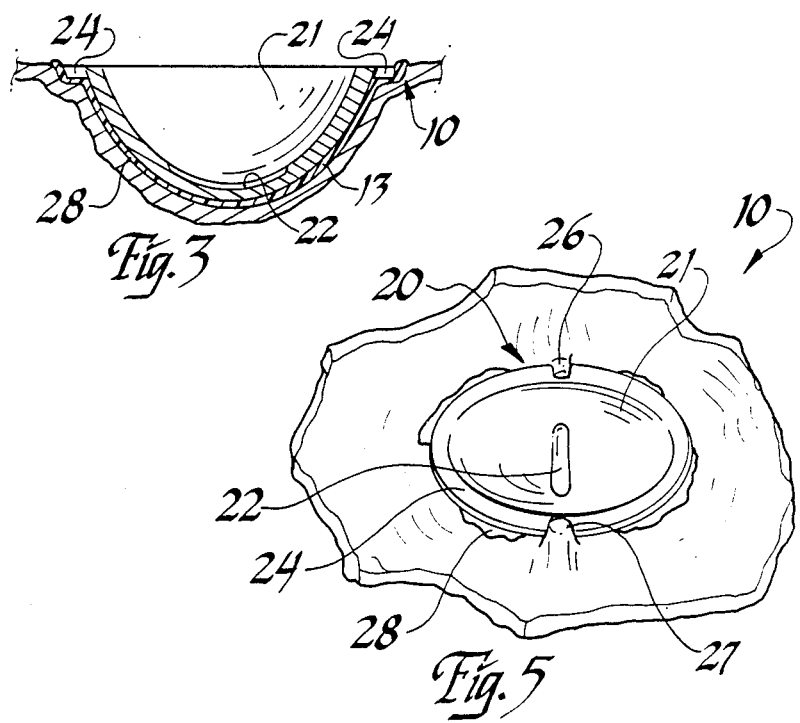

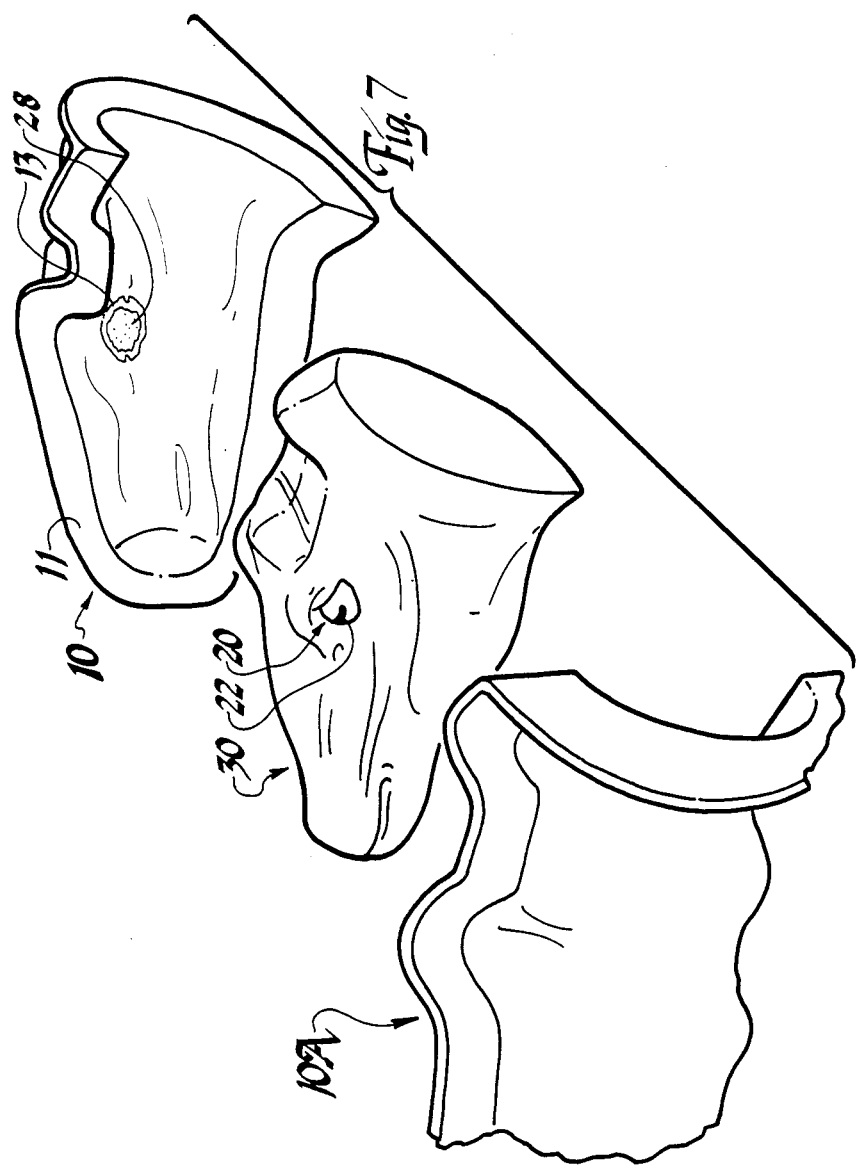

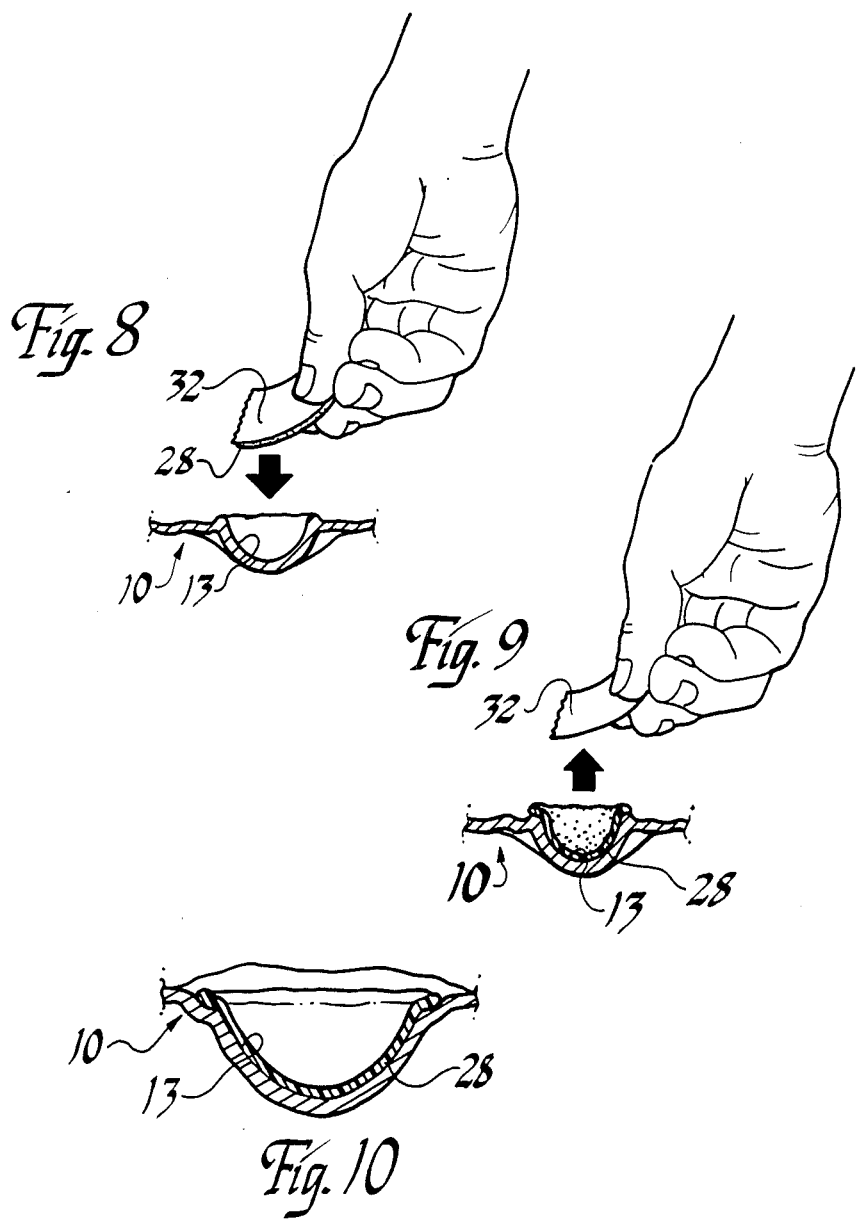

TAXIDERMY MOLD WITH MEANS FOR HOLDING EYE WITHIN MOLD DURING FORMATION OF TAXIDERMY FORM, AND METHOD

TECHNICAL FIELD AND BACKGROUND OF THE INVENTION

This invention relates to a taxidermy mold which includes means for holding an artificial eye within the mold during the molding process so that the eye can be accurately positioned and molded into a taxidermy form. The invention according to this application also includes a method for holding an artificial eye within a taxidermy mold during the molding process. The taxidermy mold and method according to this invention maintains proper alignment of the artificial eyes and also seals the eye socket recess in the mold against the leakage of hardenable liquid foam during molding.

The completed taxidermy form is then used by a taxidermist on which to mount an animal skin. The end product is typically mounted on a wall as a trophy.

Obviously, the taxidermist desires to make the trophy as lifelike as possible. For this reason, very carefully manufactured glass or plastic eyes are inserted into sockets in the taxidermy form. One way of accomplishing this is for the taxidermist himself to insert the eyes into the sockets of the completed taxidermy form at the same time as he applies the skin. This procedure was invariably followed in the past and is still used by many taxidermists today. However, this procedure is time consuming and relatively complicated. Since many glass eyes include a pupil, care must be taken to properly align the pupil in relation to the mold so that the eye appears to be as natural and lifelike as possible. There are a number of axes on which the eye must be properly aligned for it to appear lifelike and to constitute a correct anatomical representation of an animal.

Because of the time and expense required and lack of consistently accurate results achieved by taxidermist-inserted eyes, some manufacturers of taxidermy forms now mold the eye into the form at the same time as the form itself is poured. The form is made by pouring hardenable polyurethane liquid foam into a cavity formed by two mold parts which are placed together. Recesses are provided in the interior walls of the mold parts and an eye is releasably secured to each of the recesses. The rear of each eye projects outwardly into the cavity. As the liquid hardens, the eye is molded into the taxidermy form.

For this procedure to work, the eye must be properly aligned so that when the skin is applied to the taxidermy form, the eyes appear in their natural and anatomically correct position. This is difficult to do, since, when the eye is inserted into the recess in the interior wall of the mold parts, the outer surface of the eye cannot be seen. Furthermore, once the eye is properly aligned, the eye must be maintained in exactly that position during the pouring process and afterwards until the foam has hardened and the mold parts can be removed to expose the form. Any such means of maintaining the eye in its precise alignment must also release the eye from the eye socket recess of the mold parts when the mold is removed from the completed form.

The Rinehard U.S. Pat. No. 4,511,522 discloses the use of a cleanable adhesive which is placed between the eye socket recess and the front portion of the eye. The adhesive holds the eye in the eye socket recess during the molding process. When the two mold parts of the mold are separated, the adhesive stays on the surface of the eye and the adhesive is cleaned from the eye after the form is removed from the mold.

There are a number of disadvantages to this practice. First, a significant amount of adhesive, cumulatively, is used since the adhesive sticks to the eye. Obviously, a new supply of adhesive must be applied to the eye socket recess before each mold is poured. Furthermore, the fact that an additional step is required simply to remove the adhesive. These disadvantages substantially increase the time and expense necessitated by securing the eye into the eye socket recess in this manner.

SUMMARY OF THE INVENTION

Therefore, it an object of the invention to provide a taxidermy mold with means for holding an artificial eye within the mold during the molding process.

It is another object of the invention to provide a means for holding an artificial eye within the mold using an adhesive, wherein a number of forms can be molded using a single application of adhesive.

It is yet another object of the invention to provide a means for holding an artificial eye within the mold during the molding process by using an adhesive which stays adhered to the mold and cleanly separates from the eye upon removal of the mold parts from the completed form.

It is yet another object of the invention to provide a means by which the adhesive can be simply and easily applied to the eye socket recess when needed.

It is a still further object of the invention to provide a method of holding an artificial eye within a taxidermy mold during the molding process.

These and other objects of the present invention are achieved in the preferred embodiment disclosed below by providing a taxidermy mold with means for holding an artificial eye within the mold during the molding process whereby the eye is molded into a taxidermy form. According to a preferred embodiment of the invention, the taxidermy mold comprises a pair of opposing, complementary mold parts adapted to fit together to form a cavity, each mold having interior walls defining an anatomically correct internal shape for forming an anatomically correct taxidermy form upon the introduction of a hardenable foaming liquid into the cavity. An eye socket recess is formed in the interior walls of each of the mold parts. The recesses have a shape defining a part of a sphere and are adapted to receive the front, spherical portion of an artificial eye while leaving an exposed rear part extending into the mold cavity for being molded into the hardened foam of the taxidermy form.

An adhesive is applied to the surface of the eye socket recess portion of the interior walls of each of the mold parts. The adhesive has selective adhesion for holding the artificial eye into the eye socket recess during molding and sealing the eye socket recess against the leakage of the liquid foam during molding. The adhesive is retained on the surface of the eye socket recess and is releasable from the artificial eye as the taxidermy mold is removed from the molded taxidermy form upon hardening of the foam to reveal a molded taxidermy form having an eye substantially free of adhesive.

Preferably, the adhesive comprises a relatively thin adhesive coating applied to the surface of a tape having a relatively low coefficient of friction. The adhesive is therefore releasable onto the surface of the eye socket recess of the mold having a relatively greater coefficient of friction by applying the adhesive side of the tape to the eye socket recess and removing the tape to leave the adhesive coating on the surface of the eye socket recess.

According to a preferred embodiment of the invention, the adhesive comprises a relatively tacky rubber cement.

According to another embodiment of the invention, the adhesive may be applied to the eye socket recess by a brush.

According to yet another embodiment of the invention, the adhesive may be applied to the eye socket by spraying.

In accordance with the method according to the present invention, a pair of opposing, complementary mold parts is provided. The mold parts are adapted to fit together to form a cavity, with each mold having interior walls defining an anatomically correct internal shape for forming an anatomically correct taxidermy form upon the introduction of a hardenable foaming liquid into the cavity. An eye socket recess is provided in the interior walls of each of the mold parts. The recess has a shape defining a part of a sphere and is adapted to receive the front, spherical portion of an artificial eye while leaving an exposed, rear part extending into the mold cavity for being molded into the hardened foam of the taxidermy form. An adhesive is applied to the surface of the eye socket recess portion of the interior walls of each of the mold parts. The adhesive has a selective adhesion for holding an artificial eye in the eye socket recess during molding and sealing the eye socket recess against the introduction of the foam liquid thereinto during molding. The artificial eye is applied into the eye socket recess and releasably adheres itself to the eye socket recess during molding. Finally, the taxidermy mold is removed from the hardened taxidermy form to reveal a molded taxidermy form having an eye molded therein which is substantially free of adhesive.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 2 is a top plan view of an artificial eye in accordance with the present invention;

FIG. 3 is a vertical cross-sectional view taken through the eye socket recess portion of the taxidermy mold shown in FIG. 1 with the eye shown in FIG. 2 in correct position therein;

FIG. 4 is a perspective view of the eye shown in FIG. 2;

FIG. 5 is a fragmentary perspective view of the portion of the internal wall of the mold part shown in FIG. 1, with the eye in proper position therein;

FIG. 7 is a view of a taxidermy form molded from the mold part shown in FIG. 1;

FIG. 8 is a partial, cross-sectional view showing the tape being applied to the eye socket recess portion of the taxidermy mold;

FIG. 9 is a partial, cross-sectional view showing the tape being removed, with the adhesive remaining on the surface of the eye socket recess; and FIG. 10 is a cross-sectional view of the eye socket recess showing that the adhesive remains after removal of the eye.

DESCRIPTION OF THE PREFERRED EMBODIMENT

Figure 1:
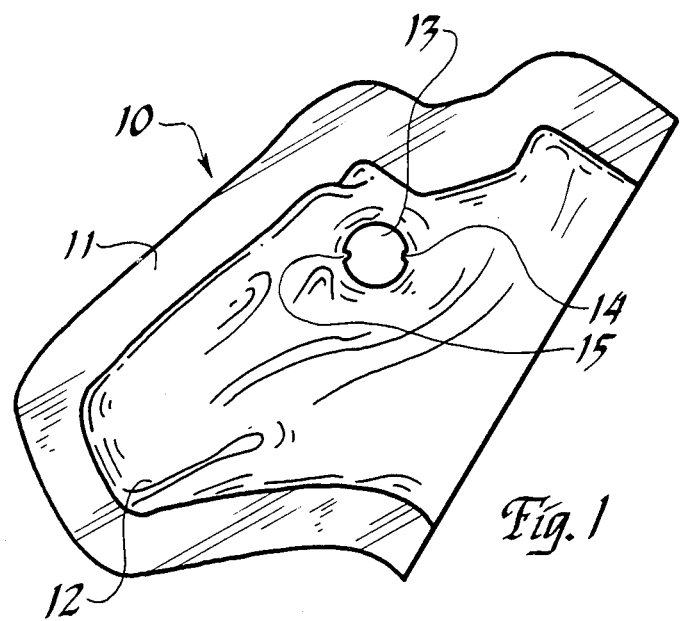
FIG. 1 is a view of the inside of one of the two complementary mold parts of the mold, from which the taxidermy form is molded.

Referring now specifically to the drawings, one half of a taxidermy mold, comprising a taxidermy mold part is shown and generally designated at reference numeral 10. The mold part shown in FIG. 1 is the right-hand mold part. A left-hand mold part 10A is also utilized and is shown fragmentarily in FIG. 6. Since both mold parts 10 and 10A are functionally identical, further explanation will be with reference to the mold part 10, it being understood that the explanation applies also to mold part 10A.

Mold part 10 comprises a planar flange 11 which is integrally formed with interior walls 12 of mold part 10. Interior walls 12 define an anatomically correct internal shape which, when mated with the left-hand mold part 10A defines a cavity into which a hardenable polyurethane foaming liquid is introduced. The internal walls of mold part 10 also include an eye socket recess 13. Eye socket recess 13 is substantially semispherical in shape and conforms to the ball of an artificial eye 20 (FIGS. 2 and 4). Still referring to FIG. 1, two lugs 14 and 15 are integrally formed into mold part 10 on the edge of and extending into eye socket recess 13. Preferably, lugs 14 and 15 are diametrically opposed.

Referring now to FIG. 2, an artificial eye 20 of the type used to practice the present invention is shown.

Eye 20 comprises a semispherical concentric positive meniscus body 21 having an outer convex surface and inner concave surface. Eye 20 has a rod-shaped elongate pupil 22 molded therein. Eye 20 also is provided with a substantially circular flange 24 which is interrupted by two notches 26 and 27 formed therein. With concurrent reference to FIGS. 1 and 2, notches 26 and 27 are adapted to be positioned in locking relationship with lugs 14 and 15 which expand into eye socket recess 13.

Preferably, lugs 14 and 15 are somewhat smaller than notches 26 and 27. This permits some of the liquid foam to run into the remaining space in notches 26 and 27 and harden. Therefore, when mold part 10 is removed, the hardened foam itself forms a lug which assists in maintaining eye 20 in proper position.

Referring now to FIG. 3, an adhesive 28 according to the present invention is shown. The adhesive is of a type such as a tacky rubber cement which is easily released from surfaces having a relatively low coefficient of friction while, at the same time, adheres tenaciously to surfaces which are rough or otherwise have a relatively high coefficient of friction. One such adhesive which performs satisfactorily is supplied on a tape 32 manufactured by Minnesota, Mining & Manufacturing Company and bearing Item No. 924. Heretofore, this tape 32 has been primarily used by artists to "paste-up" newspaper or magazine copy and by picture framers to hold together two or more layers of mat board or the like. In its manner of use, tape 32 is applied, adhesive side down, to a surface. Tape 32 is pressed along its length, then, one end of the tape is pulled away from the surface and as the tape is peeled away, the adhesive 28 detaches itself from the slick underside of the tape and remains adhered to the surface to which it was pressed. As used in accordance with the invention described in this application, tape 32, with adhesive 28 on the bottom side, is depressed into the eye socket recess 13 of mold part 10, as is shown in FIG. 8. Then, as is shown in FIG. 9, tape 32 is withdrawn leaving adhesive 28 adhered to the surface of eye socket recess 13 of mold part 10.

As is shown in FIG. 7, when the mold part 10 is removed from the completed form 30, the adhesive 28 remains in eye socket recess 13, whereas the eye 20 is substantially clean and free of adhesive. As is shown in FIG. 10, adhesive 28 maintains substantial conformity with the shape of the eye socket recess 13. In addition to holding eye 20 within eye socket recess 13 during molding, the adhesive 28 also provides a seal which prevents the liquid foam from running to minute spaces between the surface of eye 20 and eye socket recess 13.

Once mold part 10 is removed (see FIG. 6), the hardened foam holds eye 20 in its proper position.

Figure 6:
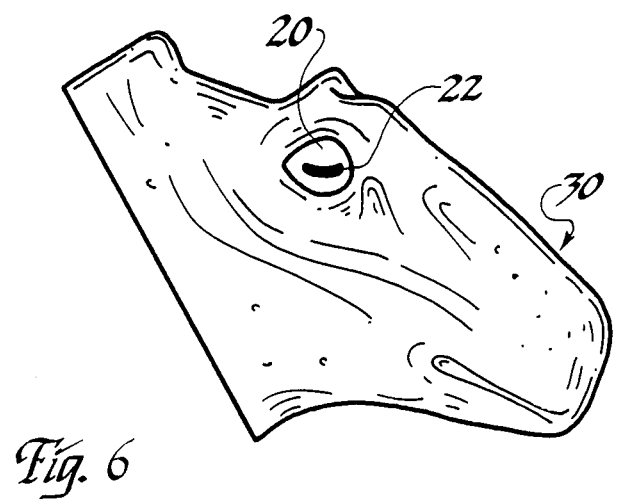
FIG. 6 is an exploded, fragmentary view of the mold.

A view of the completed taxidermy form is shown in FIG. 6 and designated by reference numeral 30. As is shown, the portion of eye 20 which was in direct contact with eye socket recess 13 is visible and free of adhesive. As is shown in FIG. 10, the adhesive remains in eye socket recess 13.

This method makes it unnecessary for the manufacturer of the form to clean adhesive from the eye as is required when the invention according to the Rinehart U.S. Pat. No. 4,511,522 is practiced. Therefore, a substantial amount of time and effort is saved.

A taxidermy mold with means for holding an artificial eye within the mold during the molding process, and method are described above. Various details of the invention may be changed without departing from its scope. Furthermore, the foregoing description of the preferred embodiment according to the present invention is provided for the purpose of illustration only and not for the purpose of limitation-the invention being defined by the claims.

I claim:

1. A method of holding an artificial eye within a taxidermy mold during the molding process whereby the eye is molded into a taxidermy form, comprising the steps of:
    a. providing a pair of opposing, complementary mold parts adapted to fit together to form a cavity, with each mold part having interior walls defining an anatomically correct internal shape for forming an anatomically correct taxidermy form upon the introduction of a hardenable foaming liquid into the cavity; providing in the interior walls of each of the mold parts an eye socket recess, said recess having a shape defining a part of a sphere and adapted to receive the front, spherical portion of an artificial eye while leaving an exposed rear part extending into the mold cavity for being molded into the hardened foam of the taxidermy form;
    b. applying an adhesive to the surface of the eye socket recess portion of the interior walls of each of the mold parts, said adhesive having selective adhesion for holding an artificial eye in the eye socket recess during molding and sealing the eye socket recess against the introduction of the foamingn liquid thereinto during molding;
    c. applying the artificial eye into the eye socket recess and releasably adhering the eye to the eye socket recess during molding; and
    d. removing the taxidermy mold from the taxidermy form upon hardening of the foaming liquid to reveal a molded taxidermy form having an eye molded therein which is substantially free of adhesive.

2. A method according to claim 1, wherein the step of applying an adhesive to the surface of the eye socket recess comprises the step of applying a tape having an adhesive coating applied to a surface thereof to the eye socket recess and removing the tape to leave the adhesive coating on the surface of the eye socket recess.

3. A taxidermy mold with means for holding an artificial eye within the mold during the molding process whereby the eye is molded into a taxidermy form, said taxidermy mold comprising:
    a. a pair of opposing, complementary mold parts adapted to fit together to form a cavity, each mold part having interior walls defining an anatomically correct internal shape for forming an anatomically correct taxidermy form upon the introduction of a hardenable foaming liquid into said cavity;
    b. an eye socket recess formed in the interior walls of each of the mold parts, said recess having a shape defining a part of a sphere and adapted to receive the front, spherical portion of an artificial eye while leaving an exposed rear part extending into the mold cavity for being molded into the hardened foam of the taxidermy form; and
    c. an adhesive applied to the surface of the eye socket recess portion of the interior walls of each of the mold parts and having selective adhesive for holding the artificial eye into the eye socket recess during molding and sealing the eye socket recess against the introduction of the foaming liquid thereinto during molding, and being retained on surface of the eye socket recess and releasable from said artificial eye upon removal of the taxidermy mold from the molded taxidermy form upon hardening of the foaming liquid to reveal a molded taxidermy form having an eye substantially free of adhesive.

4. A taxidermy mold according to claim 1, wherein said adhesive comprises a relatively thin adhesive coating applied to the surface of a tape having a relatively low coefficient of friction and being releasable onto the surface of the eye socket recess having a relatively greater coefficient of friction by applying the adhesive side of the tape to the eye socket recess and removing the tape to leave the adhesive coating on the surface of the eye socket recess.

5. A taxidermy mold according to claim 1, wherein said adhesive comprises a relatively tacky rubber cement.

6. A taxidermy mold according to claim 5, wherein said adhesive is applied to the eye socket recess by a brush.

7. A taxidermy mold according to claim 5, wherein said adhesive is applied to the eye socket recess by spraying.

* * * * *